US012743754B2

(12) United States Patent
Zhou et al.

(10) Patent No.: US 12,743,754 B2
(45) Date of Patent: Sep. 22, 2026

(54) VIDEO PROCESSING METHOD AND APPARATUS, ELECTRONIC DEVICE, AND MEDIUM

(71) Applicant: Beijing Zitiao Network Technology Co., Ltd., Beijing (CN)

(72) Inventors: Feng Zhou, Beijing (CN); Junyue Cao, Beijing (CN); Ruiqi Xia, Beijing (CN); Linhao Yu, Beijing (CN); Tao Huang, Beijing (CN); Liyu Liang, Beijing (CN); Keyu Chen, Beijing (CN); Kaibo Chu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 352 days.

(21) Appl. No.: 18/571,611

(22) PCT Filed: Sep. 9, 2022

(86) PCT No.: PCT/CN2022/117970

§ 371 (c)(1),
(2) Date: Dec. 18, 2023

(87) PCT Pub. No.: WO2023/036274

PCT Pub. Date: Mar. 16, 2023

(65) Prior Publication Data

US 2024/0281938 A1 Aug. 22, 2024

(30) Foreign Application Priority Data

Sep. 9, 2021 (CN) ......................... 202111056524.9

(51) Int. Cl.

| | |
|---|---|
| ***G06T 5/77*** | (2024.01) |
| ***G06T 5/60*** | (2024.01) |
| ***G06V 10/25*** | (2022.01) |

(52) U.S. Cl.
CPC ................. *G06T 5/77* (2024.01); *G06T 5/60* (2024.01); *G06V 10/25* (2022.01); *G06V 2201/07* (2022.01)

(58) Field of Classification Search
None
See application file for complete search history.

(56) References Cited

U.S. PATENT DOCUMENTS

2014/0184858 A1 7/2014 Yu et al.
2016/0224833 A1 8/2016 Jin
(Continued)

FOREIGN PATENT DOCUMENTS

CN 101321241 A * 12/2008
CN 111556278 A 8/2020
(Continued)

OTHER PUBLICATIONS

Office Action for Chinese Patent Application No. 202111056524.9, mailed on Jul. 31, 2025, 17 pages.
(Continued)

*Primary Examiner* — David Ometz
(74) *Attorney, Agent, or Firm* — Astute IP Law Group

(57) ABSTRACT

The present disclosure provides a video processing method and apparatus, an electronic device, and a medium, and the method includes: acquiring a to-be-erased region including a to-be-erased object in each target video frame of a to-be-processed video; acquiring, for a single target video frame, acquiring, from another target video frame other than the target video frame, a target region that corresponds to a to-be-erased region of the target video frame and does not include the to-be-erased object; filling pixels of the target region into the to-be-erased region of the target video frame, to erase the to-be-erased region of the target video frame; and in response to an unerased region existing in the
(Continued)

to-be-erased region of the target video frame, predicting pixels of the unerased region according to the target video frame, and filling the unerased region according to the predicted pixels to erase the unerased region.

11 Claims, 3 Drawing Sheets

(56) References Cited

U.S. PATENT DOCUMENTS

| | | | | |
|---|---|---|---|---|
| 2020/0118594 | A1* | 4/2020 | Oxholm | G11B 27/036 |
| 2021/0374904 | A1* | 12/2021 | Liao | G06T 5/50 |
| 2022/0092796 | A1* | 3/2022 | Noh | G06T 7/97 |
| 2022/0292649 | A1* | 9/2022 | Wang | G06T 5/60 |

FOREIGN PATENT DOCUMENTS

| | | | |
|---|---|---|---|
| CN | 111860200 | A | 10/2020 |
| CN | 112118483 | A | 12/2020 |
| CN | 112883902 | A | 6/2021 |
| CN | 113052158 | A | 6/2021 |
| CN | 113095163 | A | 7/2021 |

OTHER PUBLICATIONS

Kim et al., "Deep Video Inpainting", Proceedings of the IEEE/CVF Conference on Computer Vision and Pattern Recognition (CVPR), 2019, 10 pages.

Wang et al., "Fast Online Object Tracking and Segmentation: A Unifying Approach", Proceedings of the IEEE/CVF Conference on Computer Vision and Pattern Recognition (CVPR), Jun. 2019, 13 pages.

* cited by examiner

S240

In response to an unerased region existing in the to-be-erased region of the target video frame, predicting pixels of the unerased region according to the target video frame, and filling the unerased region according to the predicted pixels to erase the unerased region.

VIDEO PROCESSING METHOD AND APPARATUS, ELECTRONIC DEVICE, AND MEDIUM

CROSS-REFERENCE TO RELATED APPLICATION

This is a national stage application based on International Patent Application No. PCT/CN2022/117970, filed Sep. 9, 2022, which claims priority to Chinese Patent Application No. 202111056524.9, filed on Sep. 9, 2021, entitled "VIDEO PROCESSING METHOD AND APPARATUS, ELECTRONIC DEVICE, MEDIUM, AND PROGRAM PRODUCT," the disclosures of which are incorporated herein by reference in their entireties.

TECHNICAL FIELD

The present disclosure relates to the field of video processing technology and, in particular, to a video processing method and apparatus, an electronic device, a medium, and a program product.

BACKGROUND

As the standard of living improves, a growing number of people go out to travel and take videos as souvenirs. However, there are often people passing by during video capturing, which tends to ruin the aesthetics of the video. Currently, erasure for a video is relatively static, for example, removal of watermarks from a video. Therefore, how to erase a dynamic object in a video has become a technical problem that needs to be resolved urgently.

SUMMARY

In order to solve the above-mentioned technical problems or at least partially solve the above-mentioned technical problems, the present disclosure provides a video processing method and apparatus, an electronic device, a medium, and a program product.

According to a first aspect of the present disclosure, a video processing method is provided, including:

acquiring a to-be-erased region including a to-be-erased object in each target video frame of a to-be-processed video;

acquiring, for a single target video frame, from another target video frame other than the target video frame, a target region that corresponds to a to-be-erased region of the target video frame and does not include the to-be-erased object;

filling pixels of the target region into the to-be-erased region of the target video frame, to erase the to-be-erased region of the target video frame;

and in response to an unerased region existing in the to-be-erased region of the target video frame, predicting pixels of the unerased region according to the target video frame, and filling the unerased region according to the predicted pixels to erase the unerased region.

Optionally, predicting pixels of the unerased region according to the target video frame includes:

predicting the pixels of the unerased region based on a region that is adjacent to the unerased region in the target video frame.

Optionally, predicting pixels of the unerased region according to the target video frame includes:

predicting the pixels of the unerased region according to the target video frame, a target video frame adjacent to the target video frame, and a target video frame that has been erased before the target video frame.

Optionally, predicting the pixels of the unerased region according to the target video frame, a target video frame adjacent to the target video frame, and a target video frame that has been erased before the target video frame, includes:

inputting the target video frame, a target video frame adjacent to the target video frame, and a target video frame that has been erased before the target video frame into a pre-trained video erasure model to predict the pixels of the unerased region.

Optionally, acquiring a to-be-erased region including a to-be-erased object in each target video frame of a to-be-processed video includes:

acquiring a candidate region including a to-be-erased object in a target video frame of the to-be-processed video;

and determining, based on the candidate region, the to-be-erased region including the to-be-erased object in each target video frame of the to-be-processed video.

Optionally, acquiring a candidate region including a to-be-erased object in a target video frame of the to-be-processed video includes:

acquiring a candidate region in a target video frame in response to a region selection operation for a to-be-erased object in the target video frame of the to-be-processed video;

or includes performing target detection on the to-be-processed video to acquire a to-be-erased object;

and determining a region including the to-be-erased object in a target video frame of the to-be-processed video as the candidate region.

According to a second aspect of the present disclosure, a video processing apparatus is provided, including:

a to-be-erased region acquiring module, configured to acquire a to-be-erased region including a to-be-erased object in each target video frame of a to-be-processed video;

a target region acquiring module, configured to acquire, for a single target video frame, from another target video frame other than the target video frame, a target region that corresponds to a to-be-erased region of the target video frame and does not include the to-be-erased object;

a first erasing module, configured to fill pixels of the target region into the to-be-erased region of the target video frame, to erase the to-be-erased region of the target video frame;

and a second erasing module, configured to, in response to an unerased region existing in the to-be-erased region of the target video frame, predict pixels of the unerased region according to the target video frame, and fill the unerased region according to the predicted pixels to erase the unerased region.

Optionally, the second erasing module is specifically configured to predict pixels of the unerased region according to the target video frame in the following manner:

predicting the pixels of the unerased region based on a region that is adjacent to the unerased region in the target video frame.

Optionally, the second erasing module is specifically configured to predict pixels of the unerased region according to the target video frame in the following manner:

predicting the pixels of the unerased region according to the target video frame, a target video frame adjacent to the target video frame, and a target video frame that has been erased before the target video frame.

Optionally, the second erasing module is specifically configured to predict the pixels of the unerased region according to the target video frame, a target video frame adjacent to the target video frame, and a target video frame that has been erased before the target video frame in the following manner:

inputting the target video frame, a target video frame adjacent to the target video frame, and a target video frame that has been erased before the target video frame into a pre-trained video erasure model to predict the pixels of the unerased region.

Optionally, the to-be-erased region acquiring module is specifically configured to acquire a candidate region including a to-be-erased object in a target video frame of the to-be-processed video; and determine, based on the candidate region, the to-be-erased region including the to-be-erased object in each target video frame of the to-be-processed video.

Optionally, the to-be-erased region acquiring module is specifically configured to acquire a candidate region including a to-be-erased object in a target video frame of the to-be-processed video through the following step:

acquiring a candidate region in a target video frame in response to a region selection operation for a to-be-erased object in the target video frame of the to-be-processed video;

or through the following steps: performing target detection on the to-be-processed video to acquire a to-be-erased object; and determining a region including the to-be-erased object in a target video frame of the to-be-processed video as the candidate region.

According to a third aspect of the present disclosure, an electronic device is provided, including a processor, the processor is configured to execute a computer program stored in a memory, and when the computer program is executed by the processor, the method described in the first aspect is implemented.

According to a fourth aspect of the present disclosure, a computer-readable storage medium is provided, storing a computer program, and when the computer program is executed by a processor, the method described in the first aspect is implemented.

According to a fifth aspect of the present disclosure, a computer program product is provided, and when the computer program product is run on a computer, the computer is enabled to perform the method described in the first aspect.

Technical solutions provided in the embodiments of the present disclosure have the following advantages compared with the prior art.

After a to-be-erased region including a to-be-erased object in each target video frame of a to-be-processed video is acquired, for a single target video frame, a target region that corresponds to a to-be-erased region of the target video frame and does not include the to-be-erased object is acquired from another target video frame other than the target video frame; and pixels of the target region are filled into the to-be-erased region of the target video frame, to erase the to-be-erased region of the target video frame. To be specific, the to-be-erased region in the target video frame is filled by a region that is not blocked by the to-be-erased object in another target video frame. In response to an unerased region existing in the to-be-erased region of the target video frame, it indicates that the unerased region is also blocked by the to-be-erased object in another target video frame. In this case, pixels of the unerased region may be predicted according to the target video frame, and the unerased region is filled according to the predicted pixels to erase the unerased region. In the embodiments of the present disclosure, the to-be-erased region is preferentially filled by raw pixels, and then pixels of the unerased region are predicted, to improve the accuracy of video erasure, thereby reducing a re-capturing rate of the video.

BRIEF DESCRIPTION OF DRAWINGS

The drawings herein are incorporated into and form a part of the specification, illustrate the embodiments consistent with the present disclosure, and are used in conjunction with the specification to explain the principles of the present disclosure.

In order to more clearly illustrate the technical solutions in the embodiments of the present disclosure or in prior art, the drawings to be used in the description of the embodiments or prior art will be briefly described below, and it will be obvious to those ordinarily skilled in the art that other drawings can be obtained on the basis of these drawings without inventive work.

DETAILED DESCRIPTION

In order to understand the above objects, features and advantages of the present disclosure more clearly, the solutions of the present disclosure will be further described below. It should be noted that, in case of no conflict, the features in one embodiment or in different embodiments can be combined.

Many specific details are set forth in the following description to fully understand the present disclosure, but the present disclosure can also be implemented in other ways different from those described here; obviously, the embodiments in the specification are a part but not all of the embodiments of the present disclosure.

Figure 1:
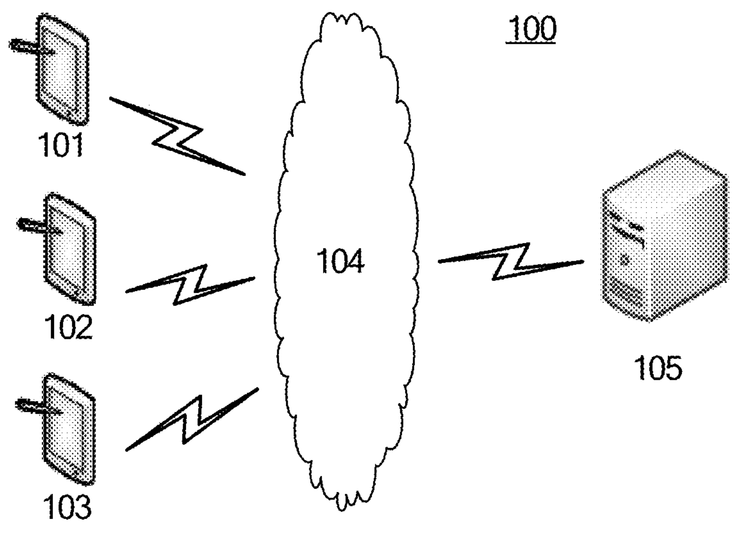
FIG. 1 is a schematic diagram of a system architecture of an exemplary application environment that is applicable to a video processing method according to at least one embodiment of the present disclosure.

FIG. 1 is a schematic diagram of a system architecture of an exemplary application environment that is applicable to a video processing method according to at least one embodiment of the present disclosure.

As shown in FIG. 1, a system architecture 100 may include one or more of a terminal device 101, a terminal device 102, and a terminal device 103, a network 104, and a server 105. The network 104 is used to provide a medium for communication links between the terminal device 101, the terminal device 102, the terminal device 103, and the server 105. The network 104 may include various connection types, such as wired and wireless communication links or fiber optic cables. The terminal device 101, the terminal device 102, and the terminal device 103 may be various electronic devices having a display, including, but not limited to, desktop computers, portable computers, smartphones, and tablet computers. It should be understood that quantities of terminal devices, networks, and servers in FIG. 1 are merely exemplary. There may be any quantity of terminal devices, networks, and servers according to an implementation requirement. For example, the server 105 may be a server cluster including a plurality of servers, or the like.

The video processing method provided by the embodiments of the present disclosure is usually performed by the server 105, correspondingly, a video processing apparatus may be provided in the server 105. However, it is easily understood by the person skilled in the art that the video processing method provided by the embodiments of the present disclosure may also be performed by the terminal device 101, the terminal device 102, and the terminal device 103. For example, the terminal device 101, the terminal device 102, and the terminal device 103 may upload a to-be-processed video to the server 105. The processor 105 processes the to-be-processed video based on the video processing method provided by the embodiments of the present disclosure to obtain a video after erasure, and sends the video obtained after erasure to the terminal device 101, the terminal device 102, and the terminal device 103.

Figure 2:
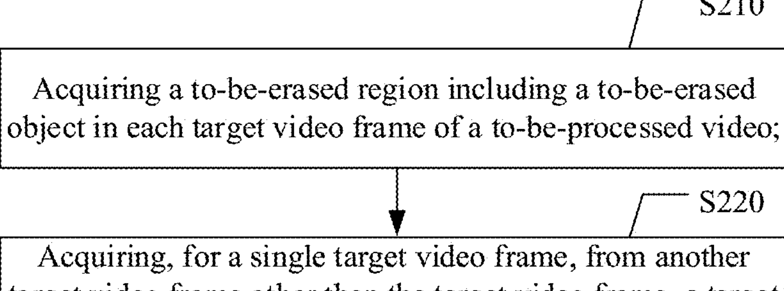
FIG. 2 is a flowchart of a video processing method according to at least one embodiment of the present disclosure.
Figure 2:
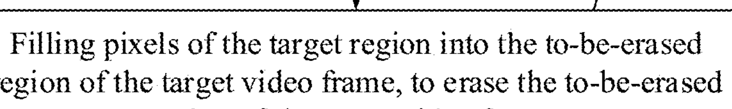

Referring to FIG. 2, FIG. 2 is a flowchart of a video processing method according to at least one embodiment of the present disclosure. The video processing method may include the following steps.

Step S210: acquiring a to-be-erased region including a to-be-erased object in each target video frame of a to-be-processed video.

Step S220: acquiring, for a single target video frame, from another target video frame other than the target video frame, a target region that corresponds to a to-be-erased region of the target video frame and does not include the to-be-erased object.

Step S230: filling pixels of the target region into the to-be-erased region of the target video frame, to erase the to-be-erased region of the target video frame.

Step S240: in response to an unerased region existing in the to-be-erased region of the target video frame, predicting pixels of the unerased region according to the target video frame, and filling the unerased region according to the predicted pixels to erase the unerased region.

According to the video processing method in the embodiments of the present disclosure, after a to-be-erased region including a to-be-erased object in each target video frame of a to-be-processed video is acquired, for a single target video frame, a target region that corresponds to a to-be-erased region of the target video frame and does not include the to-be-erased object is acquired from another target video frame other than the target video frame; and pixels of the target region are filled into the to-be-erased region of the target video frame, to erase the to-be-erased region of the target video frame. To be specific, the to-be-erased region in the target video frame is filled by a region that is not blocked by the to-be-erased object in another target video frame. In response to an unerased region existing in the to-be-erased region of the target video frame, it indicates that the unerased region is also blocked by the to-be-erased object in another target video frame. In this case, pixels of the unerased region may be predicted according to the target video frame, and the unerased region is filled according to the predicted pixels to erase the unerased region. In the embodiments of the present disclosure, the to-be-erased region is preferentially filled by raw pixels, and then pixels of the unerased region are predicted, to improve the accuracy of video erasure, thereby reducing a re-capturing rate of the video.

The following describes the technical solutions of the embodiments of the present disclosure in detail.

In step S210, the to-be-erased region including the to-be-erased object in each target video frame of the to-be-processed video is acquired.

In the embodiments of the present disclosure, the to-be-processed video is a video including a to-be-erased object (for example, a passerby or an object in the to-be-processed video), and there may be one or more to-be-erased objects. The to-be-erased object is usually in a plurality of target video frames (that is, video frames including the to-be-erased object), and a candidate region including the to-be-erased object in a target video frame of the to-be-processed video may be first acquired herein. When there are a plurality of to-be-erased objects, the plurality of to-be-erased objects may correspond to a same candidate region, or correspond to a plurality of candidate regions. The shape of the candidate region may be preset, for example, a rectangle, an ellipse, or the like. Because a to-be-erased target in the present disclosure is the to-be-erased object, the to-be-erased region including the to-be-erased object may be an outline region of the to-be-erased object.

In an optional implementation, a user may select the to-be-erased object according to an actual requirement. Specifically, in any target video frame including the to-be-erased object, the user may perform a region selection operation for the to-be-erased object in the target video frame, for example, select the to-be-erased object by using a preset rectangular box. A server acquires the candidate region in the video frame in response to the region selection operation for the to-be-erased object in the target video frame.

In another optional implementation, the server may alternatively actively acquire the to-be-erased object in the to-be-processed video. For example, the server may perform target detection on the to-be-processed video to acquire the to-be-erased object. For example, when it is recognized, through target detection, that the to-be-processed video includes a passerby, the passerby may be determined as the to-be-erased object, and a region that includes the to-be-erased object in a target video frame of the to-be-processed video is determined as the candidate region.

Then, the to-be-erased region including the to-be-erased object in each target video frame of the to-be-processed video may be determined based on the candidate region.

Figure 3:
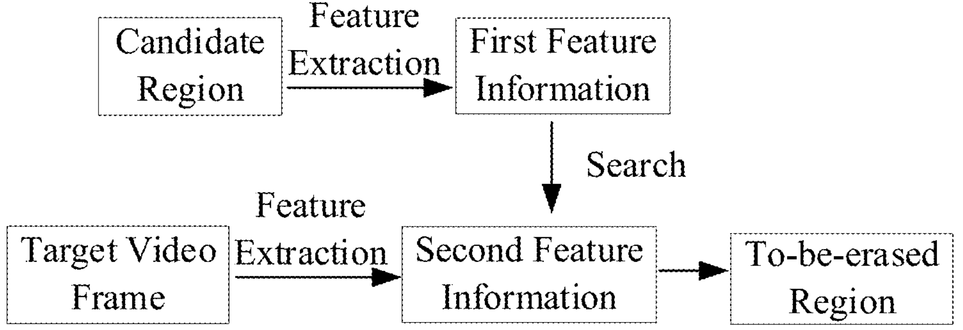
FIG. 3 is a schematic diagram of determining a to-be-erased region according to at least one embodiment of the present disclosure.

Optionally, full-image search may be performed for the target video frame based on the candidate region, to acquire the to-be-erased region of the target video frame. FIG. 3 is a schematic diagram of determining a to-be-erased region according to at least one embodiment of the present disclosure. Feature extraction may be performed on the candidate region to obtain first feature information, and the first feature information includes feature information of the to-be-erased object. Similarly, feature extraction is performed on a single target video frame of the to-be-processed video to obtain second feature information, and the second feature information also includes the feature information of the to-be-erased object. Therefore, the second feature information may be searched based on the first feature information for feature information having a highest similarity with the first feature information, and a region corresponding to the feature information having the highest similarity is determined as the to-be-erased region.

In step S220, for a single target video frame, the target region that corresponds to the to-be-erased region of the target video frame and does not comprise the to-be-erased object is acquired from another target video frame other than the target video frame.

The to-be-erased object is movable in the to-be-processed video, and during this process, the position of the to-be-erased object relative to the background usually changes. On this basis, the to-be-erased region of the target video frame may be filled by a region that is not blocked by the to-be-erased object in another target video frame, to erase the to-be-erased object in the target video frame.

Specifically, for a single target video frame, backgrounds of the target video frame and another target video frame may be aligned, and a region that is blocked by the to-be-erased object in the target video frame but is not blocked by the to-be-erased object in another target video frame, that is, the target region in another target video frame, is acquired from another target video frame. It may be understood that, a smaller time difference between another target video frame and the target video frame indicates a smaller difference between the two target video frames, and a smaller target region in another target video frame. In the present disclosure, target regions corresponding to a plurality of other target video frames may be separately acquired from the plurality of other target video frames, and repeated regions are removed from a set of a plurality of target regions, to form a final target region.

In step S230, the pixels of the target region are filled into the to-be-erased region of the target video frame, to erase the to-be-erased region of the target video frame.

Because the target region is an original region in another target video frame, the pixels of the target region may be directly filled into the to-be-erased region of the target video frame, to erase the to-be-erased region of the target video frame. In response to the target region covering the to-be-erased region of the target video frame, the to-be-erased region of the target video frame can be completely erased by performing this step. However, in some scenarios, the target region cannot cover the to-be-erased region of the target video frame, in this case, step S240 may be performed subsequently.

In step S240, in response to an unerased region existing in the to-be-erased region of the target video frame, pixels of the unerased region are predicted according to the target video frame, and the unerased region is filled according to the predicted pixels to erase the unerased region.

In response to an unerased region existing in the to-be-erased region of the target video frame, that is, the to-be-erased region of the target video frame cannot be completely erased by using the target region, in this case, the pixels of the unerased region may be predicted based on the target video frame. Optionally, the pixels of the unerased region may be predicted directly based on a region that is adjacent to the unerased region in the target video frame. For example, gradient processing may be performed on pixels of the region adjacent to the unerased region, to predict the pixels of the unerased region. The region adjacent to the unerased region may include a region that has been erased by performing step S230, that is, a region that has been erased in the to-be-erased region of the target video frame.

It should be noted that, because the respective target video frames are continuous video frames, in the present disclosure, the unerased region of the target video frame may be erased by using time continuity of the target video frames, to ensure that the video obtained after erasure has no abruptness, thereby improving the erasure effect of the video. Optionally, individual target video frames may alternatively be processed sequentially in a time order of the respective target video frames. For a single target video frame, the pixels of the unerased region may be predicted according to the target video frame, a target video frame adjacent to the target video frame, and a target video frame that has been erased before the target video frame.

For the first target video frame, because there is no erased target video frame before the first target video frame, the unerased region of the first target video frame may be erased according to the first target video frame and a target video frame adjacent to the first target video frame. The target video frame adjacent to the first target video frame may be one or more target video frames after the first target video frame. Specifically, the pixels of the unerased region may be predicted according to a region that is adjacent to the unerased region in the target video frame, and a region that is adjacent to a region corresponding to the unerased region in the target video frame adjacent to the first target video frame. Compared with predicting the pixels of the unerased region only based on the region that is adjacent to the unerased region in the target video frame, the above-mentioned manner can combine more feature information to improve the accuracy of pixel prediction.

After erasure is performed on the first target video frame, for the second target video frame or any subsequent target video frame, reference may be further made to the target video frame that has been erased before the target video frame. For example, when erasure is performed on the second target video frame, the to-be-erased region of the second target video frame may be erased according to the second target video frame, a target video frame adjacent to the second target video frame, and the first target video frame that has been erased. Compared with performing erasure only according to a target video frame on which erasure has not been performed, the above-mentioned manner can further improve the accuracy of erasure.

For the second target video frame or any subsequent target video frame, video frames adjacent to the target video frame may include a target video frame before the video frame and a target video frame after the video frame. For example, for the fourth target video frame, the corresponding adjacent video frames may be the second target video frame and the sixth target video frame, or the like.

Optionally, the target video frame, a target video frame adjacent to the target video frame, and a target video frame that has been erased before the target video frame may be input into a pre-trained video erasure model to predict the pixels of the unerased region, thereby effectively extracting feature information from the adjacent target video frame, and predicting the pixels of the unerased region based on the extracted feature information. The video erasure model may be, for example, a visual inertial network VINET model. The VINET model is an end-to-end trainable deep neural network architecture for solving the problem of visual inertial odometry in the field of robotics. Potential content from adjacent video frames may be collected and improved, and semantically coherent video content may be synthesized in space and time. For time consistency, feedback loops and memory layers (for example, a sequence LSTM) may be used. Optical flow loss is used to learn distortion and distortion loss of previously synthesized frames, to implement short-term and long-term consistency of results. Therefore, based on the VINET model, the accuracy of predicting the pixels of the unerased region can be improved, and the video erasure effect can be improved.

According to the video processing method in the embodiments of the present disclosure, the user may manually select the candidate region including the to-be-erased object in the target video frame, and the server may alternatively actively detect the to-be-erased object, and acquire the candidate region in the target video frame. Then, the to-be-erased object in each target video frame is tracked by using the candidate region, to acquire the to-be-erased region in the target video frame. The to-be-erased region is preferentially filled by the target region that does not include the to-be-erased object, that corresponds to the to-be-erased region of the target video frame, and that is in another target video frame, then the pixels of the unerased region are predicted, and the unerased region of each target video frame is erased by using the adjacent target video frame and the target video frame that has been erased, so that the video obtained after erasure is more accurate and fluent.

Figure 4:
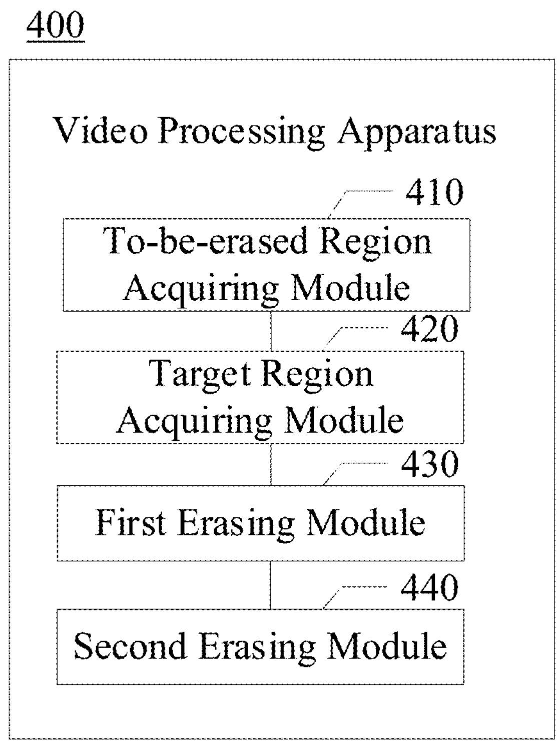
FIG. 4 is a schematic diagram of a structure of a video processing apparatus according to at least one embodiment of the present disclosure.

Corresponding to the above-mentioned method embodiments, the embodiments of the present disclosure further provide a video processing apparatus. With reference to FIG. 4, the video processing apparatus 400 includes:

a to-be-erased region acquiring module 410, configured to acquire a to-be-erased region including a to-be-erased object in each target video frame of a to-be-processed video;

a target region acquiring module 420, configured to acquire, for a single target video frame, from another target video frame other than the target video frame, a target region that corresponds to a to-be-erased region of the target video frame and does not include the to-be-erased object;

a first erasing module 430, configured to fill pixels of the target region into the to-be-erased region of the target video frame, to erase the to-be-erased region of the target video frame;

and a second erasing module 440, configured to, in response to an unerased region existing in the to-be-erased region of the target video frame, predict pixels of the unerased region according to the target video frame, and fill the unerased region according to the predicted pixels to erase the unerased region.

Optionally, the second erasing module 440 is specifically configured to predict the pixels of the unerased region according to the target video frame in the following manner:

predicting the pixels of the unerased region based on a region that is adjacent to the unerased region in the target video frame.

Optionally, the second erasing module 440 is specifically configured to predict the pixels of the unerased region according to the target video frame in the following manner:

predicting the pixels of the unerased region according to the target video frame, a target video frame adjacent to the target video frame, and a target video frame that has been erased before the target video frame.

Optionally, the second erasing module 440 is specifically configured to predict the pixels of the unerased region according to the target video frame, the target video frame adjacent to the target video frame, and the target video frame that has been erased before the target video frame in the following manner:

inputting the target video frame, a target video frame adjacent to the target video frame, and a target video frame that has been erased before the target video frame into a pre-trained video erasure model to predict the pixels of the unerased region.

Optionally, the to-be-erased region acquiring module 410 is specifically configured to acquire a candidate region including a to-be-erased object in a target video frame of the to-be-processed video; and determine, based on the candidate region, the to-be-erased region including the to-be-erased object in each target video frame of the to-be-processed video.

Optionally, the to-be-erased region acquiring module 410 is specifically configured to acquire the candidate region including the to-be-erased object in a target video frame of the to-be-processed video in the following steps:

acquiring a candidate region in a target video frame in response to a region selection operation for a to-be-erased object in the target video frame of the to-be-processed video;

or includes: performing target detection on the to-be-processed video to acquire a to-be-erased object;

and determining a region including the to-be-erased object in a target video frame of the to-be-processed video as the candidate region.

Specific details of each module or unit in the above-mentioned apparatus have been described in detail in the corresponding method, and therefore are not described herein again.

It should be noted that although several modules or units of the device for action execution are mentioned in the detailed description above, this division is not mandatory. Actually, according to the embodiments of the present disclosure, features and functions of two or more modules or units described above may be embodied in a single module or unit. Conversely, the features and functions of one module or unit described above may be further divided to be embodied by a plurality of modules or units.

An exemplary embodiment of the present disclosure further provides an electronic device, including a processor and a memory configured to store instructions that can be executed by the processor. The processor is configured to perform the above-mentioned video processing method in the embodiments of the present disclosure.

Figure 5:
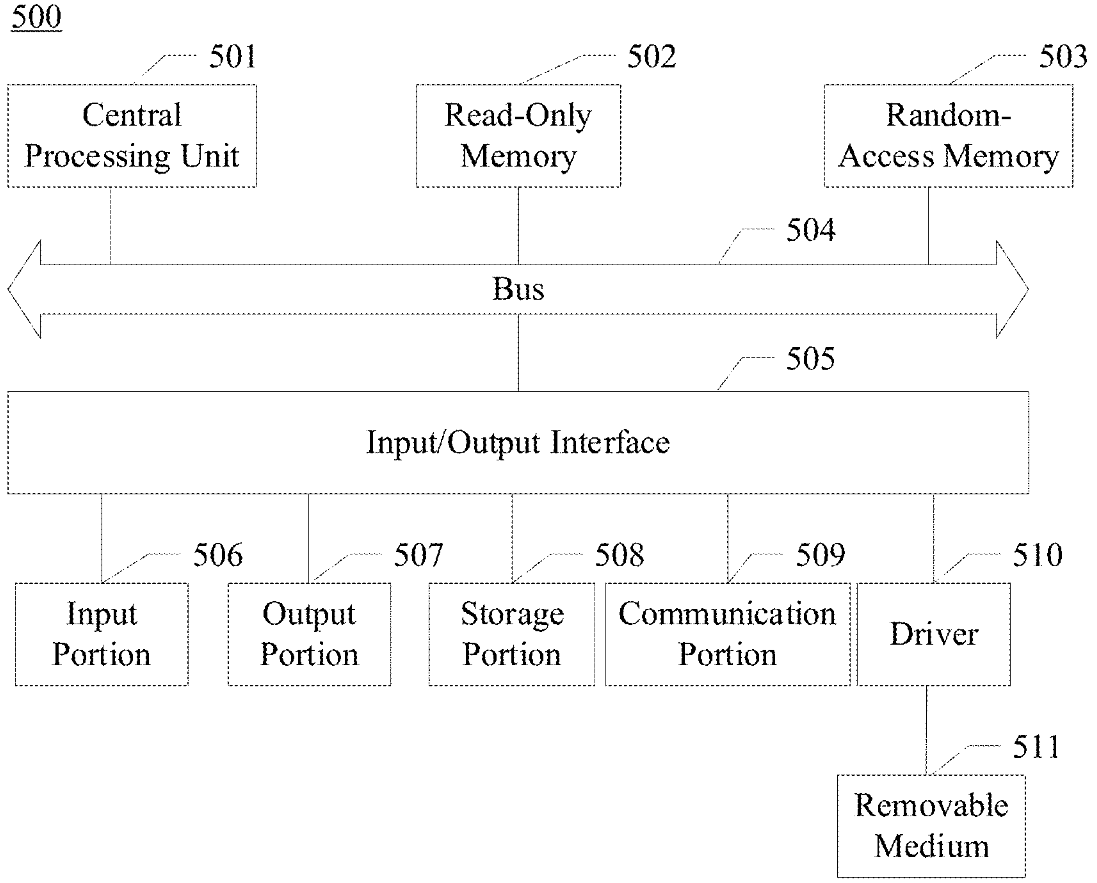
FIG. 5 is a schematic diagram of a structure of an electronic device according to at least one embodiment of the present disclosure.

FIG. 5 is a schematic diagram of a structure of an electronic device according to at least one embodiment of the present disclosure. It should be noted that the electronic device 500 shown in FIG. 5 is merely an example and should not bring any limitation on the functions and scope of use of embodiments of the present disclosure.

As shown in FIG. 5, the electronic device 500 includes a central processing unit (CPU) 501, which may perform various suitable actions and processing according to a program stored in a read-only memory (ROM) 502 or loaded from a storage portion 508 into a random-access memory (RAM) 503. The RAM 503 also stores various programs and data necessary for system operation. The central processing unit 501, the ROM 502, and the RAM 503 are connected to each other via a bus 504. An input/output (I/O) interface 505 is also connected to the bus 504.

The following components are connected to the I/O interface 505: an input portion 506 including a keyboard, a mouse, and the like; an output portion 507 including a cathode ray tube (CRT), a liquid crystal display (LCD), and the like, and a speaker, and the like; a storage portion 508 including a hard disk, and the like; and a communication portion 509 including a network interface card such as a local area network (LAN) card, a modem, and the like. The communication portion 509 performs communication processing via a network such as the Internet. A driver 510 is also connected to the I/O interface 505 as required. A removable medium 511, such as a magnetic disk, an optical disc, a magneto-optical disk, a semiconductor memory, and the like, is installed on the driver 510 as required, so that computer programs read therefrom are installed into the storage portion 508 as required.

Particularly, according to the embodiments of the present disclosure, the processes described above with reference to the flowcharts may be implemented as a computer software program. For example, the embodiments of the present disclosure include a computer program product, which includes a computer program carried on a computer-readable medium. The computer program includes program codes for performing the methods shown in the flowcharts. In such embodiments, the computer program may be downloaded online through the communication portion 509 and installed, and/or may be installed from the removable medium 511. When the computer program is executed by the central processing unit 501, various functions defined in the apparatus of the present disclosure are implemented.

The embodiments of the present disclosure further provide a computer-readable storage medium. The computer-readable storage medium stores a computer program, and when the computer program is executed by a processor, the above-mentioned video processing method is implemented.

It should be noted that the above-mentioned computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory, a read-only memory, an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. The program code contained on the computer-readable medium may be transmitted by using any suitable medium, including but not limited to an electric wire, a fiber-optic cable, radio frequency and the like, or any appropriate combination of them.

The embodiments of the present disclosure further provide a computer program product. When the computer program product is run on a computer, the computer is enabled to perform the above-mentioned video processing method.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limitation, an element defined by the phrase "includes a . . . " does not preclude the existence of additional identical elements in the process, method, article or device that includes the element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

The invention claimed is:

1. A video processing method, comprising:

acquiring a to-be-erased region comprising a to-be-erased object in each first video frame of a to-be-processed video;

acquiring, for a single first video frame, from another first video frame other than the first video frame, a first region that corresponds to a to-be-erased region of the first video frame and does not comprise the to-be-erased object;

filling pixels of the first region into the to-be-erased region of the first video frame, to erase the to-be-erased region of the first video frame; and in response to an unerased region existing in the to-be-erased region of the first video frame, predicting pixels of the unerased region according to the first video frame, and filling the unerased region according to the predicted pixels to erase the unerased region;

wherein predicting pixels of the unerased region according to the first video frame comprises:

in response to the first video frame not being a first one of video frames in the to-be-processed video, predicting the pixels of the unerased region according to the first video frame, at least one video frame adjacent to the first video frame, and a second video frame, wherein a position of the second video frame in the to-be-processed video is before a position of the first video frame in the to-be-processed video, and a to-be-erased region in the second video frame has been erased and pixel filling or pixel prediction of the to-be-erased region of the second video frame has been completed.

2. The method according to claim 1, wherein predicting pixels of the unerased region according to the first video frame comprises:

predicting the pixels of the unerased region based on a region that is adjacent to the unerased region in the first video frame.

3. The method according to claim 1, wherein predicting the pixels of the unerased region according to the first video frame, at least one video frame adjacent to the first video frame, and a second video frame, comprises:

inputting the first video frame, the at least one video frame adjacent to the first video frame, and the second video frame into a pre-trained video erasure model to predict the pixels of the unerased region.

4. The method according to claim 1, wherein acquiring a to-be-erased region comprising a to-be-erased object in each first video frame of a to-be-processed video comprises:

acquiring a candidate region comprising the to-be-erased object in one first video frame of the to-be-processed video; and determining, based on the candidate region, the to-be-erased region comprising the to-be-erased object in each first video frame of the to-be-processed video.

5. The method according to claim 4, wherein acquiring a candidate region comprising a to-be-erased object in one first video frame of the to-be-processed video comprises:

acquiring the candidate region in the one first video frame in response to a region selection operation for the to-be-erased object in the one first video frame of the to-be-processed video; or comprises:

performing target detection on the to-be-processed video to acquire the to-be-erased object; and determining a region comprising the to-be-erased object in the one first video frame of the to-be-processed video as the candidate region.

6. An electronic device, comprising a processor, wherein the processor is configured to execute a computer program stored in a memory, when the computer program is executed by the processor, a video processing method is implemented, and the video processing method comprises:

acquiring a to-be-erased region comprising a to-be-erased object in each first video frame of a to-be-processed video;

acquiring, for a single first video frame, from another first video frame other than the first video frame, a first region that corresponds to a to-be-erased region of the first video frame and does not comprise the to-be-erased object;

filling pixels of the first region into the to-be-erased region of the first video frame, to erase the to-be-erased region of the first video frame; and in response to an unerased region existing in the to-be-erased region of the first video frame, predicting pixels of the unerased region according to the first video frame, and filling the unerased region according to the predicted pixels to erase the unerased region;

wherein predicting pixels of the unerased region according to the first video frame comprises:

in response to the first video frame not being a first one of video frames in the to-be-processed video, predicting the pixels of the unerased region according to the first video frame, at least one video frame adjacent to the first video frame, and a second video frame, wherein a position of the second video frame in the to-be-processed video is before a position of the first video frame in the to-be-processed video, and a to-be-erased region in the second video frame has been erased and pixel filling or pixel prediction of the to-be-erased region of the second video frame has been completed.

7. The electronic device according to claim 6, wherein predicting pixels of the unerased region according to the first video frame comprises:

predicting the pixels of the unerased region based on a region that is adjacent to the unerased region in the first video frame.

8. The electronic device according to claim 6, wherein predicting the pixels of the unerased region according to the first video frame, at least one video frame adjacent to the first video frame, and a second video frame, comprises:

inputting the first video frame, the at least one video frame adjacent to the first video frame, and the second video frame into a pre-trained video erasure model to predict the pixels of the unerased region.

9. The electronic device according to claim 6, wherein acquiring a to-be-erased region comprising a to-be-erased object in each first video frame of a to-be-processed video comprises:

acquiring a candidate region comprising the to-be-erased object in one first video frame of the to-be-processed video; and determining, based on the candidate region, the to-be-erased region comprising the to-be-erased object in each first video frame of the to-be-processed video.

10. The electronic device according to claim 9, wherein acquiring a candidate region comprising a to-be-erased object in one first video frame of the to-be-processed video comprises:

acquiring the candidate region in the one video frame in response to a region selection operation for the to-be-erased object in the one first video frame of the to-be-processed video; or comprises:

performing target detection on the to-be-processed video to acquire the to-be-erased object; and determining a region comprising the to-be-erased object in the one target first video frame of the to-be-processed video as the candidate region.

11. A non-transitory computer-readable storage medium, storing a computer program, wherein when the computer program is executed by a processor, a video processing method is implemented;

wherein the video processing method comprises:

acquiring a to-be-erased region comprising a to-be-erased object in each first video frame of a to-be-processed video;

acquiring, for a single first video frame, from another first video frame other than the first video frame, a first region that corresponds to a to-be-erased region of the first video frame and does not comprise the to-be-erased object;

filling pixels of the first region into the to-be-erased region of the first video frame, to erase the to-be-erased region of the first video frame; and in response to an unerased region existing in the to-be-erased region of the first video frame, predicting pixels of the unerased region according to the first video frame, and filling the unerased region according to the predicted pixels to erase the unerased region;

wherein predicting pixels of the unerased region according to the first video frame comprises:

in response to the first video frame not being a first one of video frames in the to-be-processed video, predicting the pixels of the unerased region according to the first video frame, at least one video frame adjacent to the first video frame, and a second video frame, wherein a position of the second video frame in the to-be-processed video is before a position of the first video frame in the to-be-processed video, and a to-be-erased region in the second video frame has been erased and pixel filling or pixel prediction of the to-be-erased region of the second video frame has been completed.

* * * * *